Aug. 4, 1942.   L. OESTEREICHER   2,291,751
MANUFACTURE OF FASTENER DEVICES
Filed May 2, 1940
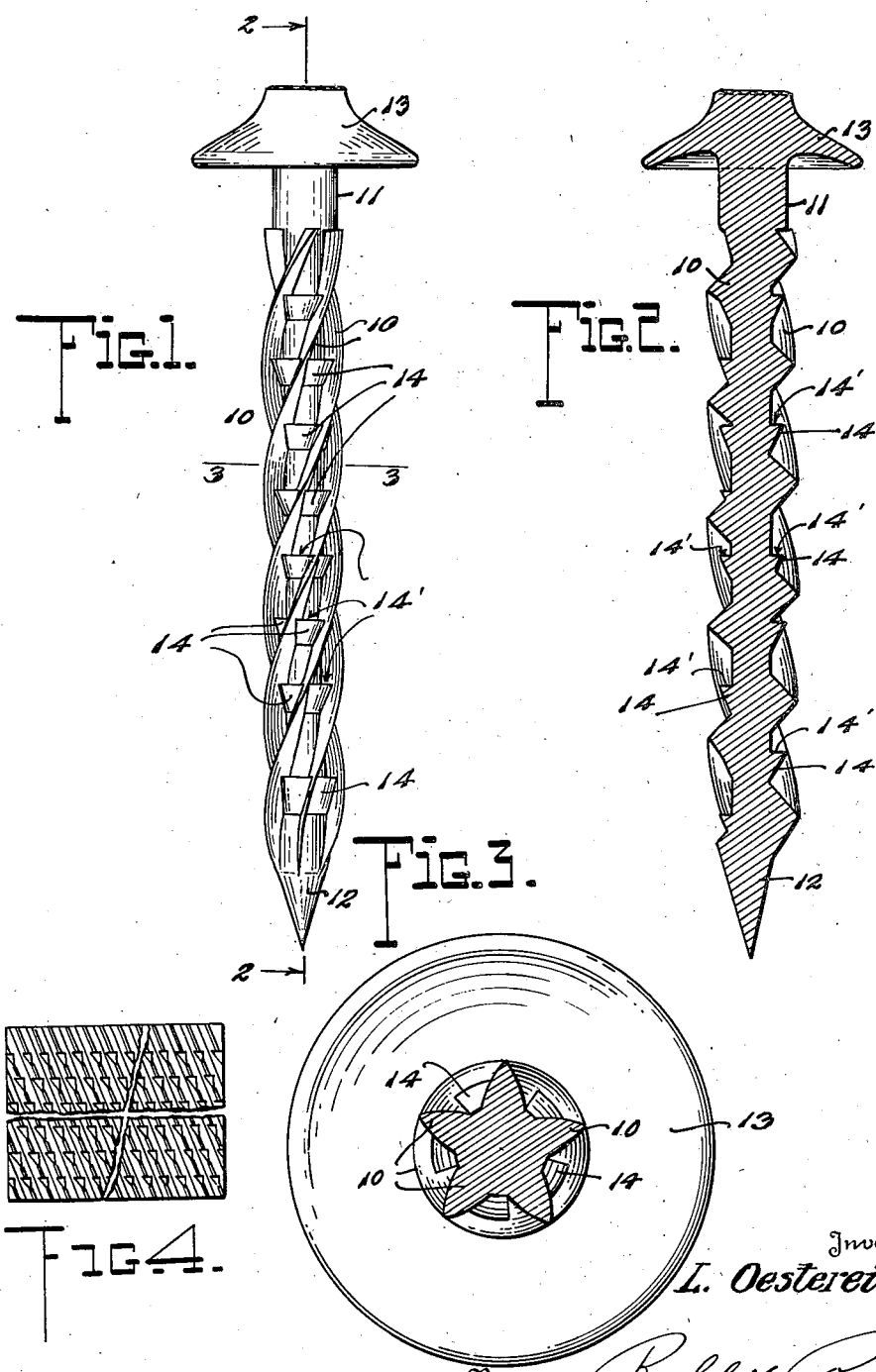

Patented Aug. 4, 1942

2,291,751

UNITED STATES PATENT OFFICE 2,291,751

MANUFACTURE OF FASTENER DEVICES

Louis Oestereicher, New York, N. Y., assignor to Parker-Kalon Corporation, New York, N. Y., a corporation of New York Application May 2, 1940, Serial No. 333,041

7 Claims. (Cl. 80—61)

This invention appertains to the art of fastening devices of the type disclosed in my co-pending application Serial No. 321,949, filed March 2, 1940, now Patent No. 2,263,137, dated November 18, 1941, and in particular to fasteners known generally as masonry and screwnails which are adapted to be hammer-driven.

Such nails are generally designed to be used when securing objects of various kinds in masonry or when securing sheet metal, and the like, to wood, and are, therefore, hardened at least at their penetrating points and formed with more or less longitudinally-extending ribs or threads, extending from the point end to, or adjacent to, the head of the nail.

Fasteners of this type have a strong holding property, but in some uses, such as when employed in work subjected to vibration and elsewhere, there exists a tendency for the fasteners to loosen up undesirably and back out of place.

The primary object of the present invention is to improve the holding capacity and materially increase resistance to withdrawal whether the fasteners embodying the invention are driven completely in or partially into a holding position.

In my patent above referred to, I have disclosed a form of resisting means designed to take effect upon any reverse rotation of a low pitch type of screw fastener, and said means are so disposed to accomplish this purpose. However, since, in the case of nails, accidental or other displacement from driven position usually takes place in a more or less longitudinal direction, the resisting means are arranged to be effective against the tendency to longitudinal displacement of the fastener or outward rotary movements produced by spiral threads of high pitch.

Other and further objects and advantages of the invention will be hereinafter described and the novel features thereof defined by the appended claims.

In the drawing—

Figure 1 is a view in elevation of a fastener device embodying my invention;

Figure 2 is a longitudinal sectional view on the line 2—2 of Figure 1;

Figure 3 is a transverse sectional view on the line 3—3 of Figure 1; and

Figure 4 is a fragmentary plan view of a die block provided with the necessary elements on the face thereof for producing the fastener which is illustrated in the drawing.

Like reference characters designate corresponding parts in the several figures of the drawing.

Referring to the drawing, the invention is illustrated in conjunction with the screwnail type of fastener which is provided with spaced spiral ribs or threads 10 of high pitch and extending along the body 11 from the point 12 to about the mushroom head 13 at the other end; but it is to be understood, however, that the ribs 10 may have even greater pitch or extend parallel to the longitudinal axis of the fastener, and may also extend down on the taper of the point and up to the head, these being common modifications of fasteners of this type.

The ribs are usually spaced sufficiently from each other to leave an appreciable surface of the shank at the base of valleys between the ribs. At predetermined intervals throughout the extent of these valleys, or the major portion thereof, I form projections 14, extending across the valleys from rib to rib, these projections being preferably, though not necessarily, arranged in parallel groups, the projections in each group being alined circumferentially, and each tapered in the direction of the point 12 from a point about mid height of the ribs to and merging into the base surface at the root diameter.

Preferably also these projections are rolled by suitable dies at the time of rolling of the ribs and in such manner as to provide an abrupt shoulder 14' that may be either at right angles to the longitudinal axis of the fastener or slightly undercut. The important part of the formation of these projections 14 is the arrangement of this undercut face so that it is facing primarily in the direction of the head and the gradual taper to the base of the valley so as to interfere as little as possible with the movement of the fastener into the material into which it is driven by a hammer blow upon its head. As it moves into the material, said material tends to overhang the shoulder 14', or to move into engagement behind said shoulder so as to establish an interlock with these projections and thereby hold the fastener device against withdrawal or outward movement so long as the fastener is driven sufficiently far into the supporting material to render one or more of the projections effective. Once these fasteners are driven into supporting material, it is practically impossible to withdraw the same, or for such fasteners to be displaced by vibrations to which they may be subjected.

While I have shown this fastener device provided with ribs spiraling in one direction of rotation, it is obvious that they might be oppositely spiraled to give a rotary movement in the reverse direction, or such ribs may be in parallel alinement with the axis of the fastener, so that no rotary movement is produced in driving the nail into holding position.

While the specific details have been herein shown and described, the invention is not confined thereto as changes and alterations may be made without departing from the spirit thereof as defined by the appended claims.

What I claim as new and desire to secure by Letters Patent is:

1. The method of forming self-locking fasteners, comprising the rolling of a blank to form ribs thereon and simultaneously extruding a locking projection from the blank as it is rolled at points between the ribs with a face at one side gradually extending upwardly from the base of the valley and an abrupt face at the other side providing a sharp shoulder extending transversely of the valley.

2. The method of forming self-locking fasteners, comprising the rolling of a blank to form ribs thereon and simultaneously extruding a locking projection from the blank at points between the ribs with a face on one side gradually inclining upwardly from the base of the valley between the ribs to a point less than the height of said ribs and an opposing abrupt face to form a stop shoulder for resisting removal of the fastener, said projections extending in a line circumferentially of the body.

3. The method of forming self-locking fasteners, comprising the rolling of a blank to form ribs thereon and simultaneously extruding locking projections extending from rib to rib in the valleys therebetween, said projections being of a tapered form to provide an abrupt shoulder facing in the direction of one end of the fastener constituting a stop preventing removal of the fasteners.

4. The method of forming self-locking fasteners, comprising the rolling of a blank to form a thread thereon and simultaneously extruding a locking projection from the blank at a point between the helices of the thread to extend in a direction longitudinally of the shank with a gradually inclined face at one side and an abrupt face at the other side.

5. The method of forming self-locking fasteners, comprising the rolling of a blank to form a thread thereon and simultaneously extruding a locking projection from the blank at a point between the helices of the thread to extend in a direction longitudinally of the shank and to a height less than the height of the thread with a gradually inclined face at one side and an abrupt face at the side.

6. The method of forming self-locking fasteners, comprising the rolling of a blank to form ribs thereon and simultaneously extruding a series of projections from the body of the blank between the ribs in such manner that each of the projections gradually inclines upwardly from the bottom face of the valley between the ribs to an abrupt shoulder extending transversely of the valley so as to arrange the projections in groups to extend circumferentially in a line about the body.

7. The method of forming self-locking fasteners, comprising the rolling of a blank to form spiral ribs thereon and simultaneously extruding locking projections from the shank of the fastener inclining upwardly from the bottom surface of the valley between the ribs and terminating in an abrupt shoulder extending transversely of said valley to a height less than the height of the ribs.

LOUIS OESTEREICHER.